United States Patent
Liu et al.

(10) Patent No.: US 11,941,356 B2
(45) Date of Patent: Mar. 26, 2024

(54) SYSTEMS AND METHODS FOR MULTI-SCALE PRE-TRAINING WITH DENSELY CONNECTED TRANSFORMER

(71) Applicant: Salesforce, Inc., San Francisco, CA (US)

(72) Inventors: Linqing Liu, Menlo Park, CA (US); Caiming Xiong, Menlo Park, CA (US)

(73) Assignee: Salesforce, Inc., San Francisco, CA (US)

(*) Notice: Subject to any disclaimer, the term of this patent is extended or adjusted under 35 U.S.C. 154(b) by 729 days.

(21) Appl. No.: 17/080,478

(22) Filed: Oct. 26, 2020

(65) Prior Publication Data
US 2022/0129626 A1   Apr. 28, 2022

(51) Int. Cl.
*G06F 40/20* (2020.01)
*G06N 3/045* (2023.01)
*G10L 15/16* (2006.01)

(52) U.S. Cl.
CPC .............. *G06F 40/20* (2020.01); *G06N 3/045* (2023.01); *G10L 15/16* (2013.01)

(58) Field of Classification Search
CPC ...................................................... G10L 15/16
See application file for complete search history.

(56) References Cited

U.S. PATENT DOCUMENTS

2014/0288928 A1* 9/2014 Penn ...................... G10L 15/16
704/232

OTHER PUBLICATIONS

Higuchi, et al. "Mask CTC: Non-Autoregressive End-to-End ASR with CTC and Mask Predict," attached reference, Aug. 17, 2020. ( 2020).*
Feng, et al. "CodeBERT: A Pre-Trained Model for Programming and Natural Languages, " attached reference, Sep. 18, 2020. (2020).*
Higuchi, et al., "Mask CTC: Non-Autoregressive End-to-End ASR with CTC and Mask Predict," 2020. (Year: 2020).*
Feng, et al., "CodeBERT: A Pre-Trained Model for Programming and Natural Languages," 2020. (Year: 2020).*
Clark et al., "Electra: Pre-training text encoders as discriminator rather than generators," arXiv preprint arXiv:2003.10555, 2020, 18 pages.
He et al., "Deep Residual Learning for Image Recognition," arXiv preprint arXiv:1512.03385v1, 2015, 12 pages.
Ba et al., "Layer Normalization," arXiv preprint arXiv:1607.06450v1, 2016, 14 pages.

* cited by examiner

*Primary Examiner* — Feng-Tzer Tzeng
(74) *Attorney, Agent, or Firm* — Haynes and Boone LLP (57) ABSTRACT

Embodiments described herein propose a densely connected Transformer architecture in which each Transformer layer takes advantages of all previous layers. Specifically, the input for each Transformer layer comes from the outputs of all its preceding layers; and the output information of each layer will be incorporated in all its subsequent layers. In this way, a L-layer Transformer network will have L(L+1)/2 connections. In this way, the dense connection allows the linguistic information learned by the lower layer to be directly propagated to all upper layers and encourages feature reuse throughout the network. Each layer is thus directly optimized from the loss function in the fashion of implicit deep supervision.

18 Claims, 8 Drawing Sheets

| Model | SST-2 | MRPC | STS-B | QQP | MNLI | QNLI | CoLA | RTE |
|---|---|---|---|---|---|---|---|---|
| BERT_LARGE | 94.9 | 85.4 | 86.5 | 89.3 | 86.7 | 92.7 | 60.5 | 70.1 |
| BERT_BASE | 93.5 | 84.8 | 85.8 | 89.2 | 84.6 | 90.5 | 52.1 | 66.4 |
| ELECTRA_SMALL | 89.1 | 83.7 | 80.3 | 88.0 | 79.7 | 87.7 | 54.6 | 60.8 |
| ELECTRA_SMALL (ours) | 89.3 | 81.4 | 78.7 | 88.3 | 80.5 | 86.6 | 54.6 | 58.8 |
| ELECTRA_SMALL (ours) + ngram | 89.9 | 81.5 | 79.3 | 88.5 | 81.0 | 87.4 | 54.8 | 61.9 |
| denseTransformer_SMALL | 90.4 | 83.1 | 80.9 | 88.7 | 80.9 | 86.7 | 52.9 | 60.5 |
| denseTransformer_SMALL + ngram | 91.2 | 82.4 | 81.6 | 88.7 | 81.1 | 87.6 | 56.6 | 62.1 |

| Model | Params | SST-2 | MRPC | STS-B | QQP | MNLI | QNLI | CoLA | RTE |
|---|---|---|---|---|---|---|---|---|---|
| denseTransformer | 22M | 90.5 | 86.3 | 88.2 | 90.6 | 80.5 | 88.2 | 60.1 | 68.2 |
| 1/1 hd_size, 1/2 fw_size | 19.36M | 89.5 | 85.3 | 87.2 | 90.2 | 79.5 | 86.3 | 59.0 | 62.0 |
| 3/4 hd_size, 3/4 fw_size | 14M | 89.0 | 81.7 | 85.3 | 89.8 | 79.6 | 86.9 | 58.6 | 62.1 |
| 1/2 hd_size, 1/2 fw_size | 7.6M | 88.8 | 83.6 | 84.1 | 89.3 | 77.9 | 85.0 | 56.6 | 58.8 |

SYSTEMS AND METHODS FOR MULTI-SCALE PRE-TRAINING WITH DENSELY CONNECTED TRANSFORMER

TECHNICAL FIELD

The present disclosure relates generally to training and use of machine learning systems and more specifically to multi-scale pre-training of a densely-connected transformer network.

BACKGROUND

The Transformer network is one of the most commonly neural network architectures for a variety of Natural Language Processing (NLP) tasks. Specifically, the Transformer network includes a number of layers, the connection between which is relatively scarce. Under the Transformer architecture, popular NLP models, such as bidirectional encoder representations from transformers (BERT), capture rich linguistic information in a hierarchical way, e.g., phrase-level information in lower layers and semantic features in higher layers. However, due to the lack of connectivity in the Transformer network, in BERT, knowledge learned at lower layers may become diluted in higher layers.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Existing pre-training methods for Transformer-based NLP models, such as BERT, typically fall into two categories: (1) pretraining tasks and objectives design; and (2) Transformer architectures and variants. These existing methods, however, generally fail to thoroughly explore the connections between Transformer layers.

In view of the under-utilization of connectivity between Transformer layers, embodiments described herein propose a densely connected Transformer architecture in which each Transformer layer takes advantages of all previous layers. Specifically, the input for each Transformer layer comes from the outputs of all its preceding layers; and the output information of each layer will be incorporated in all its subsequent layers. In this way, a L-layer Transformer network will have L(L+1)/2 connections. In this way, the dense connection allows the linguistic information learned by the lower layer to be directly propagated to all upper layers and encourages feature reuse throughout the network. Each layer is thus directly optimized from the loss function in the fashion of implicit deep supervision.

In one embodiment, instead of using the Masked Language Modeling (MLM) method, the densely connected Transformer may be pre-trained by replacing a subset of input tokens with plausible alternatives sampled from a generator network. A discriminative model is then trained to predict whether each token is original or replaced. The densely connected Transformer is then pretrained with a multi-scale discriminative objective.

Specifically, instead of predicting whether each individual token has been replaced, predicting a set of tokens together may be more informative for the model to learn. For example, for paraphrase identification task, the phrase "disease cured without therapists" may be better grouped as a set of tokens to be compared with another phrase "overcome disease by themselves" as another set of tokens, instead of a token-by-token comparison while the tokens (words) in the two phrases are rather different although the two phrases carry similar meanings. Thus, embodiments described herein provide a Ngram prediction pre-training objective which helps the model to focus on both local and global information over a sequence of tokens.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
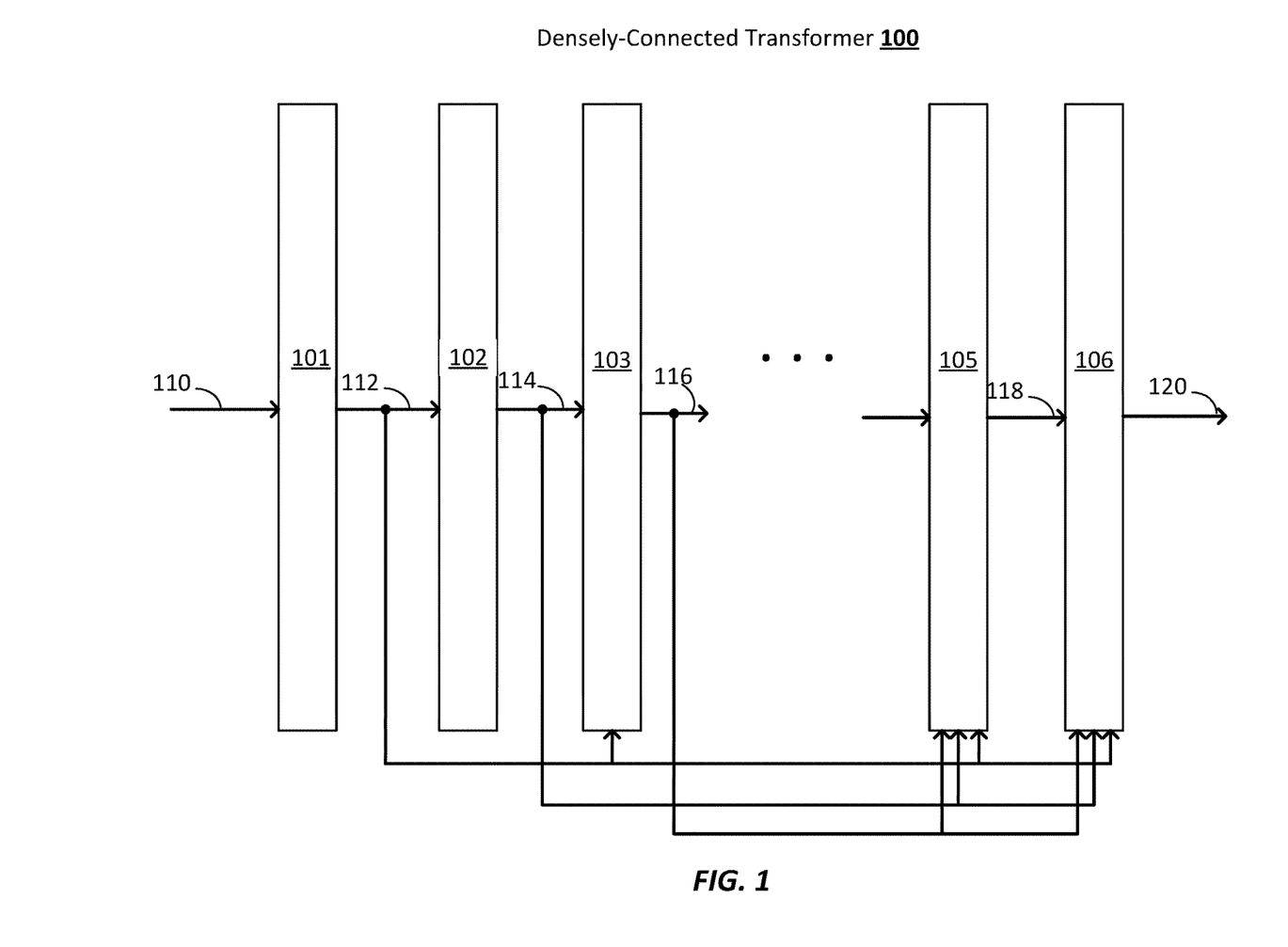
FIG. 1 provides an example diagram illustrating the structure of a densely-connected transformer network, according to an embodiment described herein.

FIG. 1 provides an example diagram illustrating the structure of a densely-connected transformer network 100, according to an embodiment described herein. The densely-connected transformer architecture (e.g., BERT) 100 may consist of a number of transformer layers 101-106. For example, layer 101 may be an embedding layer; layers 102, 103, 105 (and a number of additional layers not shown in FIG. 1) may be the transformer layers; and layer 106 may be an output layer.

Specifically, each layer 101-106 in the network 100 is represented as $T_l()$, where l indexes the layer. The output of the $l^{th}$ layer is denoted as $x_l$ and w is the output (labeled as 112) of the embedding layer 101. The transformer layer, e.g., any of layers 102-106, may take a sequence of vectors as input and output vectors of the same dimension. Each transformer layer consists of two sub-layers: a multi-head self-attention layer and a position-wise fully-connected feed-forward layer. The residual connection (e.g., see more details in He et al,) and layer normalization (e.g., see Ba et al.,) are employed around each of the two sublayers. All sub-layers in the transformer layers 102-106 as well as the embedding layer 101 produce outputs of the same dimension. Thus, the output of each layer may be represented as:

$$x_1 = T_0(w), x_l = T_l(x_{l-1})(l>0).$$

To achieve the maximum information sharing between each layer, each layer is directly connected to all its subsequent layers. Specifically, the output of each layer is sent to the input of all the subsequent layers, and the input of each layer receives outputs from all its preceding layers. For example, the output 112 of embedding layer 101 is sent to all the subsequent layers 102, 103, ..., 105, and 106; the output 114 of transformer layer 102 is sent to all the subsequent layers 103, ..., 105 and 106; and the output 116 of transformer layer 103 is sent to all the subsequent layers including 105, 106.

The input sequences for each layer are the concatenated outputs of all the previous layers plus the original word embedding sequence. For example, the input of transformer layer 106 is the concatenation of output 112 from layer 101, output 113 from layer 102, output 116 from layer 103 and output 118 from layer 105; the input of transformer layer 105 is the concatenation of output 112 from layer 101, output 113 from layer 102, and output 116 from layer 103. The input of transformer layer 103 is the concatenation of output 112 from layer 101 and output 113 from layer 102. The input of the lth layer can thus be denoted as:

$$h_l = [\omega; x_0; x_1; \ldots; x_{l-1}]$$

$$h'_l = \text{LayerNorm}(\text{GeLU}(W_l h_l))$$

$$x_l = T_l(h'_l)$$

where [ ] represents vector concatenation. In order to keep the dimension of the input vectors for each layer constant unchanged, the concatenated input vectors are fed through one layer feed-forward network with GeLU activations and layer normalization. We use the output of the final Transformer layer $x_l$ as the final output 120 of the network.

Some existing systems may have applied the connectivity pattern of the densely-connected transformer network 100 on convolutional neural networks (CNNs). But in the connected CNNs, the network design is specialized at CNN feature-maps (e.g. bottleneck layers). Instead, the densely-connected transformer network 100 is built on transformer layers without CNN-related spatial transformation or pyramid structure. In this way, the densely-connected transformer network 100 may focus on the aggregation language related properties (e.g. structures and semantics) between different layers of equal size.

In some embodiments, instead of having all transformer layers connected to their respective subsequent layers, alternative architecture may include: dense connection only within the same dense group; skip the first few layers then apply dense connection. For example, a dense group may be defined as where only layers in this group are densely connected. The output of this group may be shortcut added with the inputs vectors to all the previous group. Thus, suppose the input to kth dense group $G_k$ is $x_k$. The input $x_{k+1}$ for group $G_{k+1}$ is:

$$x_{k+1} = \text{LayerNorm}\left(\sum_{i=1}^{k} x_k + G_k(x_k)\right)$$

The output of the last dense group is used as the final output. However, experiments have shown that in Transformer architecture, densely connecting all layers yields the best performance.

Figure 2:
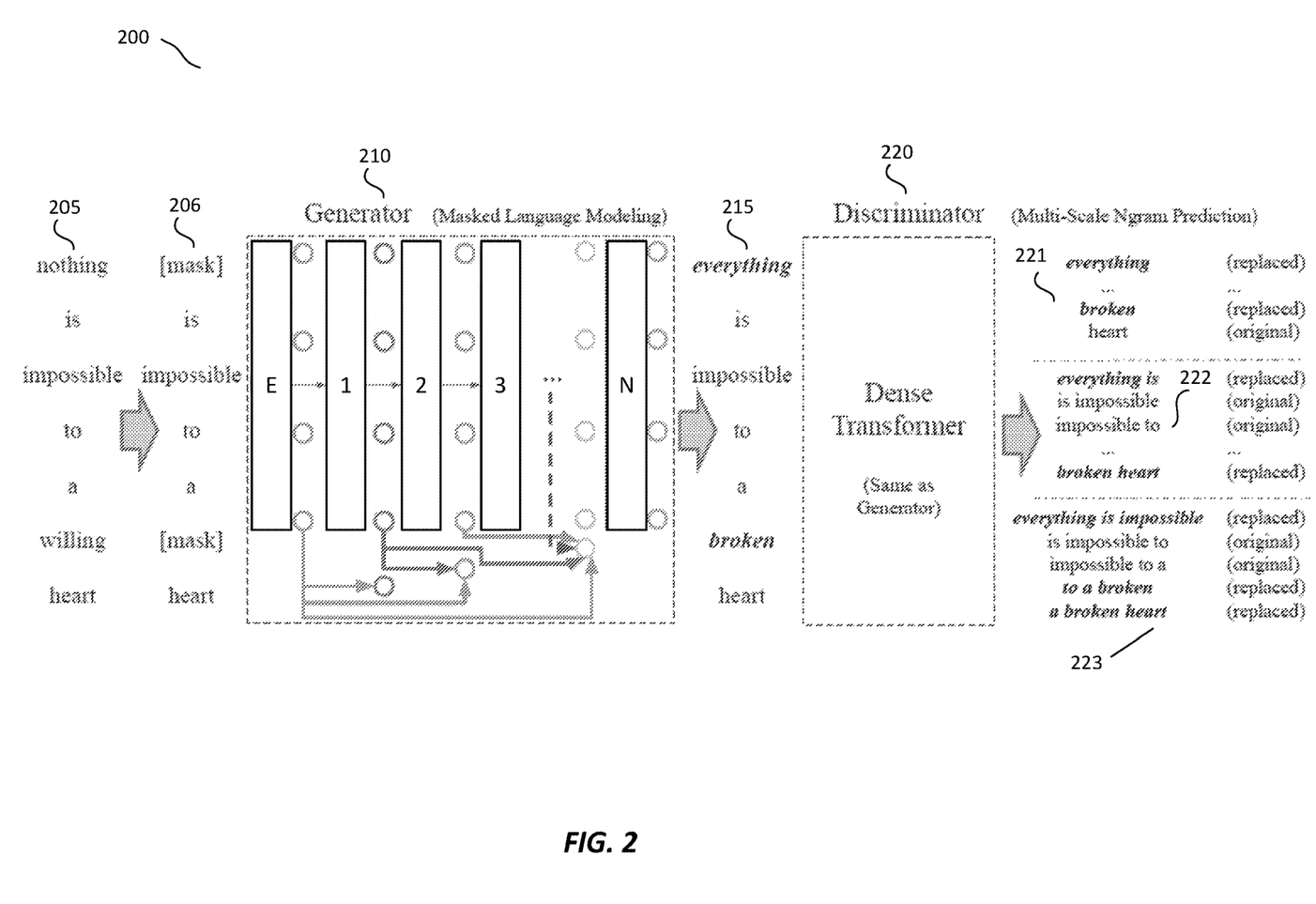
FIG. 2 provides a block diagram illustrating an overview of the pre-training framework for the densely-connected transformer network shown in FIG. 1, according to some embodiments described herein.

FIG. 2 provides a block diagram 200 illustrating an overview of the pre-training framework for the densely-connected transformer network 100 shown in FIG. 1, according to some embodiments described herein. Specifically, masked language modeling (MLM) approaches are not computational efficient because the network only learns 15% of the input tokens per example. In order to pre-train the densely-connected transformer network 100 shown in FIG. 1, a discriminative task of distinguishing replaced tokens is adopted as the objective to learn language representation, e.g., the densely-connected transformer network 100 to be pre-trained is placed as the discriminator network 220 in diagram 200. During the training stage, another densely-connected transformer network, the generator 210 is connected to the discriminator network 220 for masked language modeling.

For example, diagram 200 shows the pre-training network includes a generator network 210, denoted by G, and a discriminator network 220, denoted by D, which are serially connected to each other and may be trained end-to-end. The two neural networks 210 and 220 are both text encoders, e.g., Transformer networks, with different output layers and training objectives. Each of the generator network 210 and the discriminator network 220 may have a densely-connected structure similar to the network 100 described in FIG. 1. The discriminator network 220 may have more layers and a higher dimension of input and output compared to the generator network 210.

For a given input sequence 205 $x=[x_1, x_2, \ldots, x_n]$, the generator network 210 is trained to perform masked language modeling. A portion of the input sequence 205, e.g., 15% randomly selected set of positions m, are replaced with the [MASK] token. For example, the input sequence of "nothing is impossible to a willing heart" 205 may be randomly masked as the masked sequence 206 "[MASK] is impossible to a [MASK] heart." The masked sequence 206 is then input to the generator network 210, which has an embedding layer and a number of transformer layers that are densely connected in a similar manner as layers 101-106 in FIG. 1. The generator network 210 then generates an output that predicts the masked-out tokens. A loss objective for the generator network 210 may be given by:

$$L_G(x, \theta_G) = \mathbb{E}\left(\sum_{i \in m} -\log p_G(x_i)\right)$$

where $\theta_G$ denotes the parameters of the generator network 210; $p_G(x_i)$ denotes the predicted probability that a masked token $x_i$ has been masked. At the predicted masked positions, the generator network 210 then corrupts the original input tokens with its own samples to form the input 215 for the discriminator network 220, denoted by $x^{corrupt}$:

$$\hat{x}_i p_G(x_i) \text{ for } i \in m$$

$$x^{corrupt} = \text{REPLACE}(x, m, \hat{x})$$

For example, in the input sequence 215, "everything is impossible to a broken heart", at the first masked position, the token "everything" fills in and at the second masked position, the token "broken" fills in. The input sequence 215 is then fed to the discriminator network 220, which generates an output to distinguish whether the input tokens in $x^{corrupt}$ are original, e.g., the same as the original input tokens from the input sequence 205, or have been replaced. The loss function for the discriminator network 220 may be given by:

$$L_D(x, \theta_D) = \mathbb{E}\left(\sum_{t=1}^{n} \mathbb{1}(x_t^{corrupt} = x_t)\log D(x^{corrupt}, t) + \mathbb{1}(x_t^{corrupt} \neq x_t)\log(1 - D(x^{corrupt}, t)))\right)$$

where $\theta_D$ denotes the parameters of the discriminator 220, $x_t$ denotes the t-th token in the masked input sequence 205 and $D(x^{corrupt}, t)$ denotes the output probability of the discriminator network 220 given that the t-th token of input sequence 215 is corrupted at the input.

In some embodiments, discriminator network 220 may be trained at the single token granularity, e.g., the discriminator network 220 predicts if the corrupted individual token matches the original input token. For example, as shown at example output 221, the output layer of the discriminator 220 may predict whether each corrupted token "everything," "broken" is replaced or original. However, this single token classification strategy only focuses on the local information, which may lack a wider range of context of the input sequence to some extent. In contrast, many other NLP tasks may rely more on the global context of the input text, such as natural language inference and paraphrase identification. As such, a multi-scale ngram classification objective may be adopted by the discriminator 220 to balance the model's representation power towards both local and global features.

Specifically, instead of only predicting each individual token from the reconstructed sequence at the discriminator network 220, the discriminator network 220 may group the reconstructed sequence of tokens into a few subsets and predict whether each grouped subset contained a token that has been replaced. For example, the input for the discriminator network 220 $x'=[x'_1, x'_2, \ldots, x'_n]$ (e.g., sequence 215) consists of two parts, the original input tokens at un-masked positions (e.g., tokens "is," "impossible," "to," "a," "heart") and m generator samples (e.g. "everything," "broken") at masked positions. Starting from the first token $x'_s$, the discriminator network 220 may continuously select the subset of tokens $(x'_s, x'_{s+1}, \ldots, x'_e) \in x'$. For each selected subset $s_i$ starting from token $x'_i$ of length l:

$$s_i = [x'_i, x'_{i+1}, \ldots, x'_{i+l-1}] \text{ for } i \in [1, n-l+1]$$

The representation of $s_i$ is the average hidden states of the tokens in this span. If any of the tokens in the selected span does not match the original token, the label $y_i$ for this span is negative. The label is positive only if all the tokens (copied or sampled from generator) are the same as the original ones. The number of positive and negative selected spans are balanced when being fed into discriminator network 220. For example, in the scenario shown at 222, the reconstructed sequence of tokens are grouped into subsets of two tokens, and the subset of "everything is" and the subset of "broken heart" are predicted to have a replaced token, while other subsets are predicted to be original. For another example, in the scenario shown at 223, the reconstructed sequence of tokens are grouped into subsets of three tokens, and the subset of "everything is impossible," the subset of "to a broken" and the subset of "broken heart" are predicted to have a replaced token, while other subsets are predicted to be original.

When the maximum number of selected token is L, the loss function for discriminator network 220 is:

$$L_D(x, \theta_D) = -\mathbb{E}\left(\sum_{l=1}^{L}\sum_{i=1}^{n-l+1} y_i \log D(s_i)\right)$$

where $D(s_i)$ is the predicted probability that the subset $s_i$ contains a replaced token, and $y_i$ is the label from input sequence 215.

Thus, a combined learning objective function may be used to train the generator and discriminator together over a large corpus X:

$$\min_{\theta_G, \theta_D} \sum_{x \in X} L_G(x, \theta_G) + \lambda L_D(x, \theta_D)$$

where $\lambda$ is a weighting parameter, and $L_D(x, \theta_D)$ may be obtained by either the single token prediction or the ngram prediction objective as described above.

The combined learning objective may be used to update the discriminator network 220 via backpropagation. Because of the discrete sampling of $\hat{x}_i$, the generator network 210 may not be backpropagated by the discriminator loss $L_D(x, \theta_D)$. Instead, the generator network 210 may be separately updated by the generator loss $L_G(x, \theta_G)$ alone. After pre-training, the generator network 210 may be detached from the discriminator network 220, and only the discriminator network 220 will be fine-tuned on downstream tasks.

Figure 3:
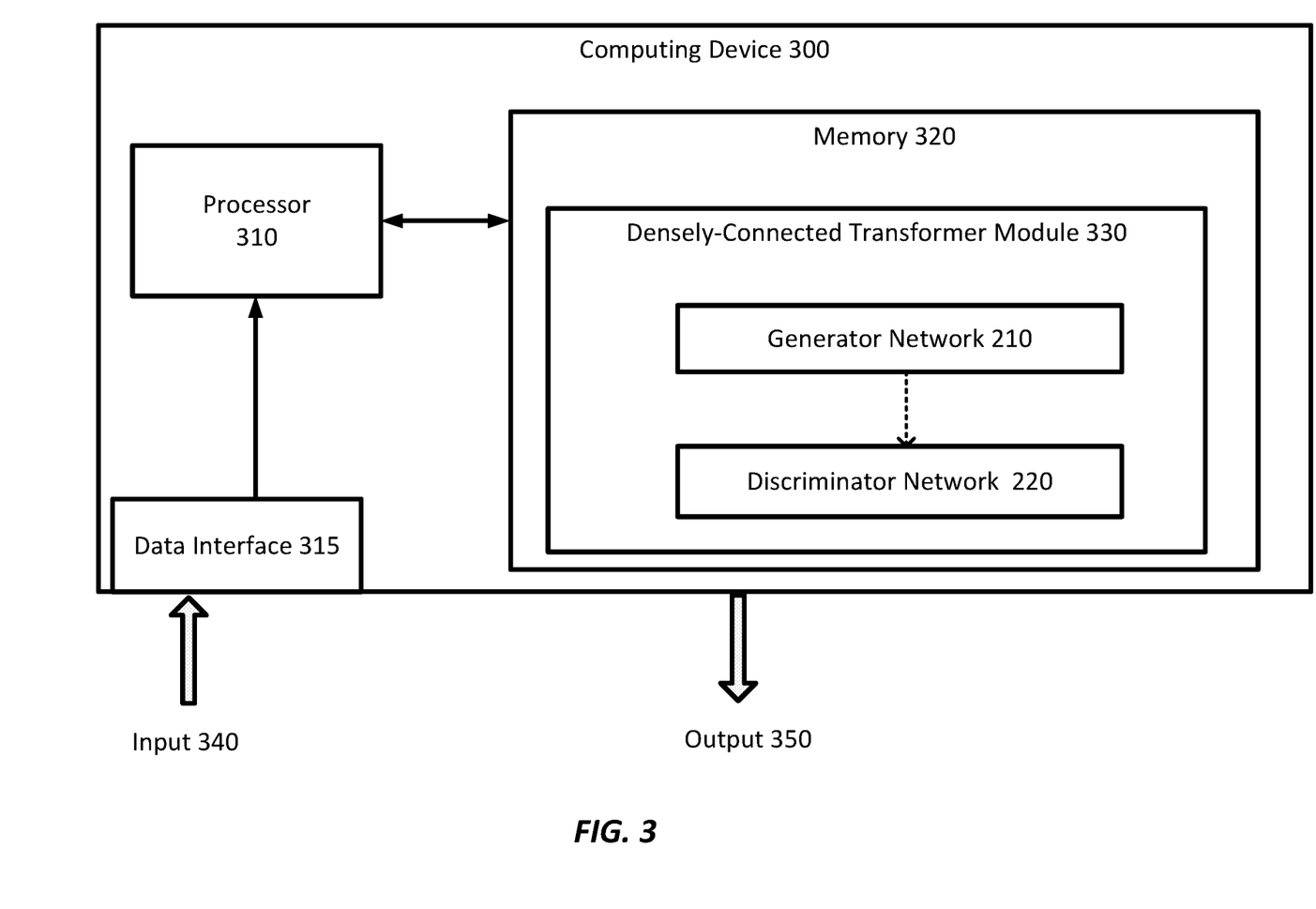
FIG. 3 is a simplified diagram of a computing device for implementing the densely-connected transformer networks described in FIGS. 1-2, according to some embodiments.

FIG. 3 is a simplified diagram of a computing device for implementing the densely-connected transformer networks described in FIGS. 1-2, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a densely-connected transformer module 330 that may be used to implement and/or emulate the systems and models, and/or to implement any of the methods described further herein. In some examples, the densely-connected transformer module 330 may be used to receive and handle the input 340 via a data interface 315. For example, the input 340 may include a textual input by a user via a user interface, a dataset of training texts via a communication interface, etc. The densely-connected transformer module 330 may generate an output 350, e.g., a reconstructed sequence in response to the input text, a prediction whether a subset of tokens at certain positions contain a replaced token. In some examples, the densely-connected transformer module 330 may also handle the iterative training and/or evaluation of a system or model.

In some embodiments, the densely-connected transformer module 330 includes the generator network 210, and the discriminator network 220. For example, each of the generator network 210 and the discriminator network 220 may have a densely-connected structure as network 100 described in FIG. 1. In one embodiment, during training stage, the generator network 210 may be serially connected with the discriminator network 220 as shown by the arrow of dashed line. In this way, a combined loss objective computed as the weighted sum of the generator loss and the discriminator loss may be used to backpropagate the discriminator network 220. During the inference stage, the generator network 210 may be removed, and only the discriminator network 220 may be used as the pre-trained densely-connected transformer network for a plurality of down-stream tasks.

The modules and/or submodules 330, 210 and 220 may be operated in parallel, concurrently, alternately, or in other manners. In some examples, the densely-connected transformer module 330 and the sub-modules 210 and 220 may be implemented using hardware, software, and/or a combination of hardware and software.

Figure 4A:
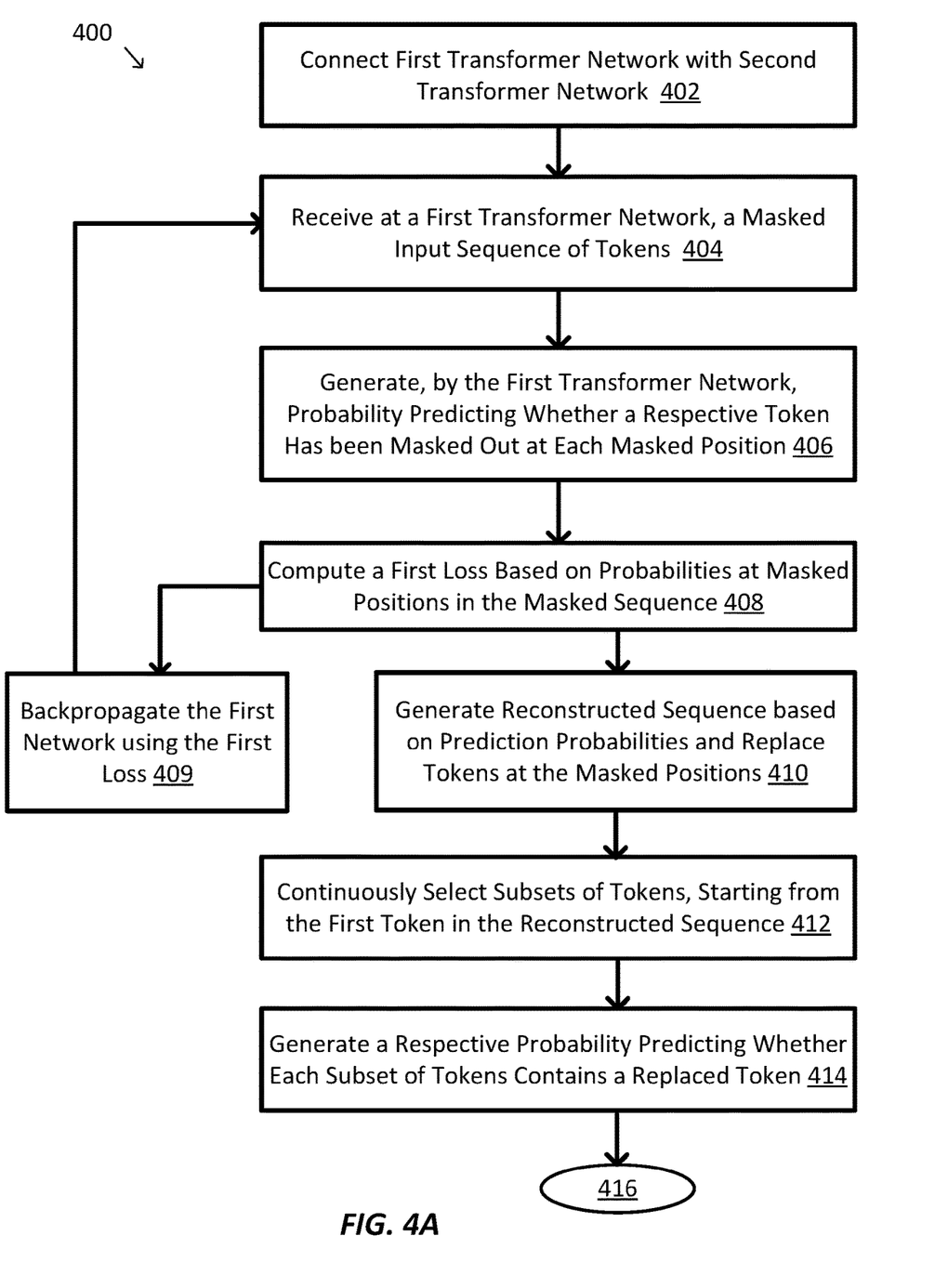
FIGS. 4A-4B provides an example flow diagram illustrating a method of multi-scale discriminative pre-training with densely connected transformer network, according to one embodiment described herein.
Figure 4B:
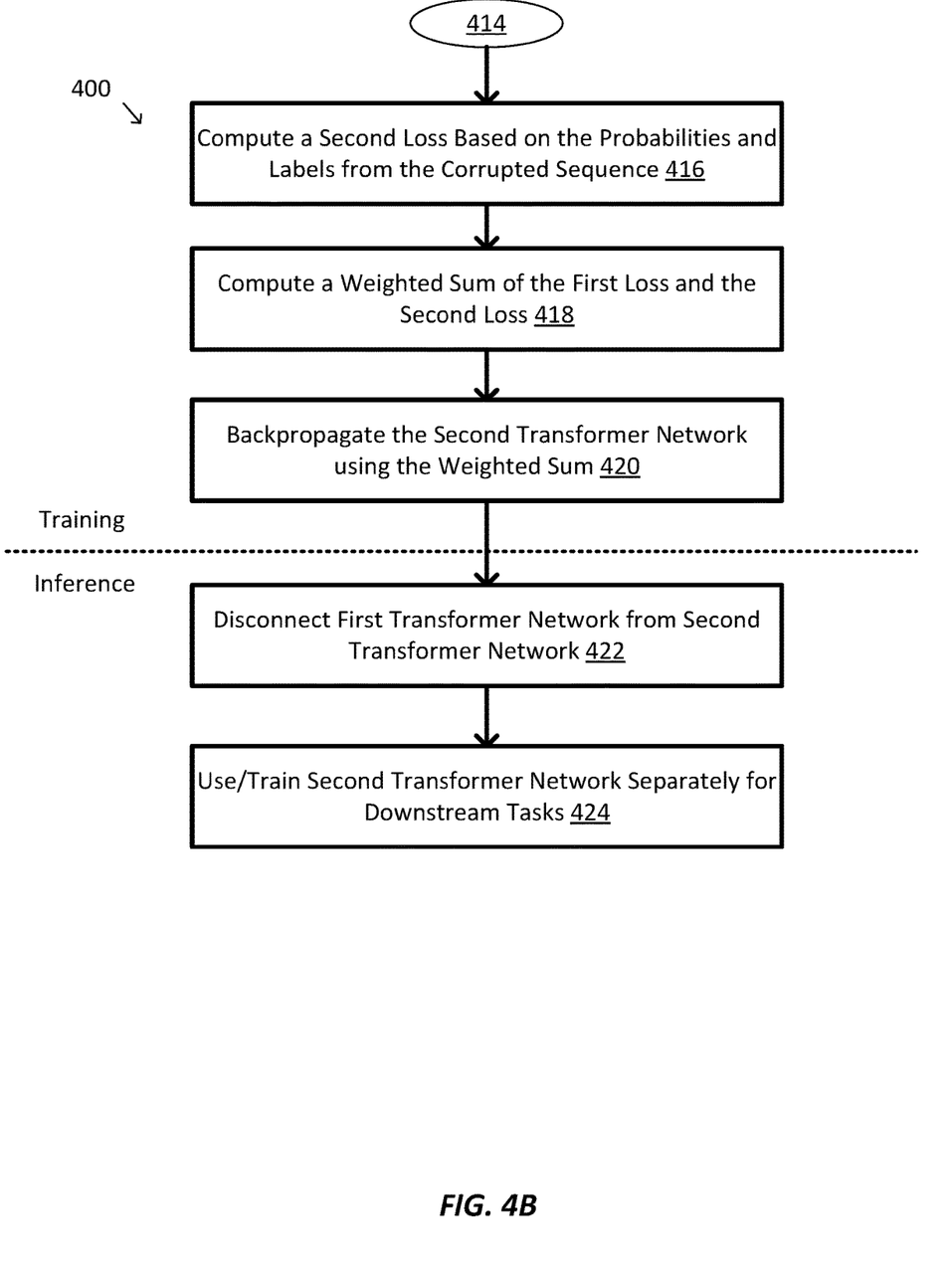

FIGS. 4A-4B provides an example flow diagram illustrating a method of multi-scale discriminative pre-training with densely connected transformer network, according to one embodiment described herein. One or more of the processes 402-424 of method 400 may be implemented, at least in part, in the form of executable code stored on non-transitory, tangible, machine-readable media that when run by one or more processors may cause the one or more processors to perform one or more of the processes 402-424. In some embodiments, method 400 may correspond to the method used by the densely-connected transformer module 330.

Method 400 starts at process 402, the first transformer network (e.g., generator 210) is connected to the second transformer network (e.g., discriminator 220) in order to pretrain the second transformer network. The first transformer network and the second transformer network have a similar structure and similar parameters, and the second transformer network has a larger scale than the first transformer network. The first transformer network includes at least a first transformer layer that receives inputs from all preceding transformer layers of the at least first transformer layer in the first transformer network, and an output of the at least first transformer layer is sent to all subsequent transformer layers of the at least first transformer layer in the first transformer network, similar to 100 in FIG. 1.

At process 404, the first transformer network receives a masked input sequence of tokens, e.g., sequence 206. At process 406, the first transformer network generates a respective probability predicting whether a respective token has been masked out at each masked position in the masked input sequence, e.g., $P_G(x_i)$. At process 408, the first transformer network computes a first loss $L_G(x, \theta_G)$ based on generated probabilities at masked positions in the masked input sequence. At process 410, the first loss may be used to update the first transformer network.

At process 410, the first transformer network may generate a reconstructed sequence (e.g., sequence 215) based on the generated probabilities. At process 412, the first transformer network may replace tokens at the masked positions in the reconstructed sequence with alternative tokens. At process 414, the first transformer network continuously selects subsets of tokens, starting from a first token in the reconstructed sequence. For example, example subsets of tokens are shown at 222 and 223 in FIG. 2. At process 416, the second transformer network may compute a second loss $L_D(x, \theta_G)$ based at least in part on the generated probabilities. At process 418, a weighted sum of the first loss and the second loss may be computed. At process 420, the second transformer network may be updated based at least on the computed weighted sum.

During the training stage, processes 404-420 may be iteratively repeated to train the second transformer network. During the inference stage of the second transformer network, the first transformer network may be disconnected from the second transformer network at process 422. At process 424, the pre-trained second transformer network may be used or trained separately without the first transformer network for downstream tasks, e.g., question-answering, text classification, etc.

Example Performance of the Densely-Connected Transformer

For pre-training corpus, data used for pre-training BERT may be used, which includes the BookCorpus (800M words) and English Wikipedia (2500M words). For evaluation, experiments are conducted on the General Lan-uage Understanding Evaluation (GLUE) benchmark. It is a collection of datasets covering different tasks: sentiment classification (SST-2), paraphrase identification (QQP and MRPC), semantic text similarity (STS-B), natural language inference (MNLI, QNLI, RTE) and linguistic acceptability (CoLA). Matthews correlations are reported for CoLA, Spearman correlation for STS, and accuracy for all other tasks. Evaluation metrics are calculated through scikit-learn API. The "GLUE score" refers to the average score over all tasks. Note that for fine-tuning no task-specific tricks are applied on the individual GLUE tasks. Following BERT, a linear layer classifier is added on top of the [CLS] prediction.

Both the re-implemented ELECTRA and denseTransformer are optimized using the parameters: $\beta_1=0.9$, $\beta_2=0.98$ (e.g., this value can improve stability when training with large batch sizes), $\varepsilon=1e-6$ and $L_2$ weight decay of 0.01. The learning rate is warmed up over the first 10000 steps and then linearly decayed. GELU activation function may be used. The dropout rate on all layers and attention weights is set to 0.1.

For discriminative pretraining, the masked language modeling (MLM) task is used to train the generator G. Dynamic masking strategy is applied whose masking positions are generated on-the-fly each time feeding the sequence to the model. The discriminator loss weight $\lambda$ in the combined loss function is set to 25, and experimented with λ=15, 25, 50, 75, 100 (25 to perform the best). For ngram prediction objective, the ngram span is selected ranging from 1-6 based on preliminary trials. Embedding weight is trained for G and D separately, but D learns better when it shares embedding with G.

Three different models from Clark et al., Electra: Pretraining text encoders as discriminator erators, arXiv preprint arXiv:2003.10555, 2020 (ELECTRA) of increasing number of parameters: small(14M), base (110M) and large (335M). The number of layers is denoted as L, the hidden size as H, the number of self-attention heads as A, and the FFN inner head size as F. Due to the limitation of computational resources, the small model pre-training hyperparameters: Discriminator (L=12, H=256, A=4, F=1024), Generator (L=12, H=64, A=1, F=256). Both G and D are pre-trained with batch-size 1024 and sequences of maximum length 128. The pre-training was done on 4 NVIDIA V100 GPUs and took 2 days to complete.

During pre-training, the following two additional strategies are observed which improves the learning of discriminator: 1) When input examples are created for discriminator by replacing the masked-out tokens with generator samples, the tokens are sampled based on the generator's distribution over the whole vocabulary, instead of directly generating the token of highest probability. 2) At each training step, after generator samples the tokens at the masked positions, the number of positive and negative samples are balanced with downsampling. So the input data labels for the discriminator are roughly balanced.

Figure 5:
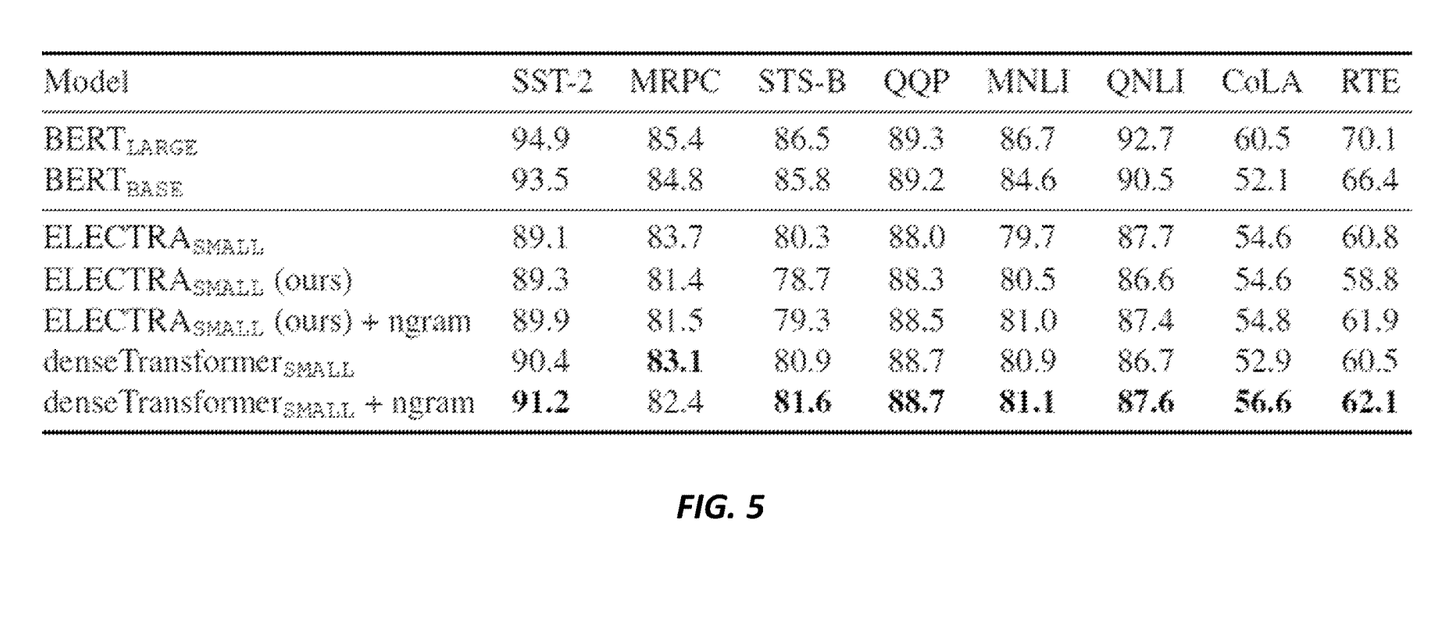
FIG. 5 provides an example table comparing performance of the densely-connected transformer with other baselines, according to one embodiment described herein.
Figure 6A:
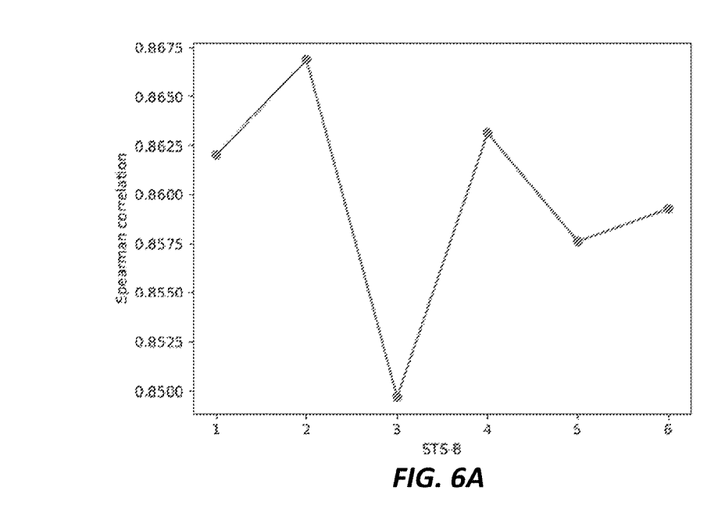
FIGS. 6A-6D show different performance metrics of the densely-connected transformer network pre-trained with different ngram granularities, according to embodiments described herein.
Figure 6B:
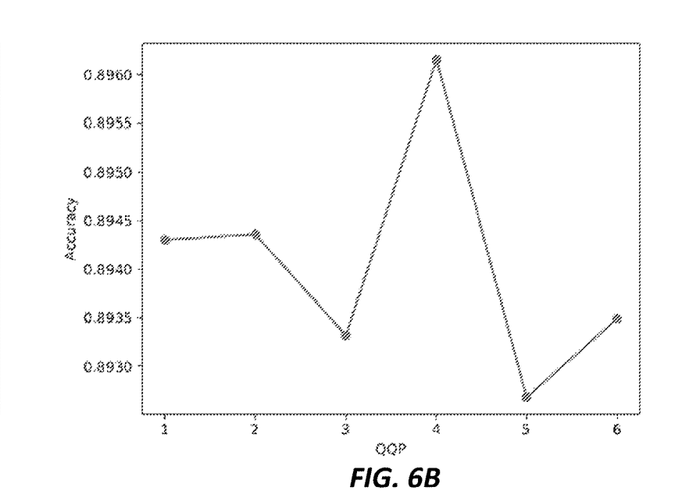
Figure 6C:
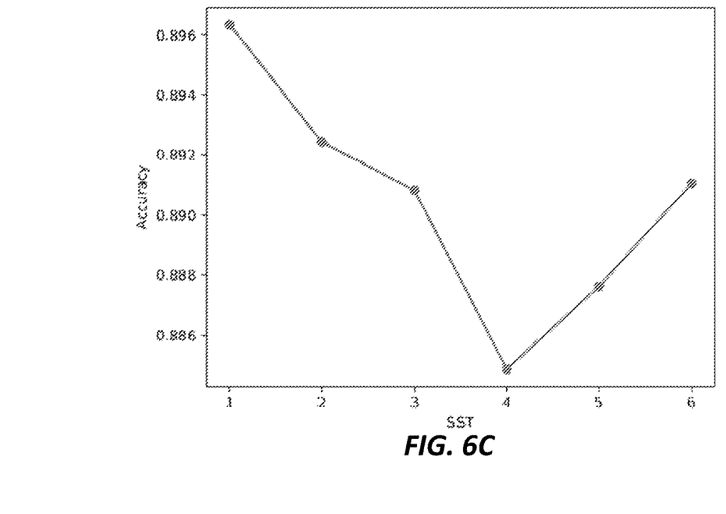
Figure 6D:
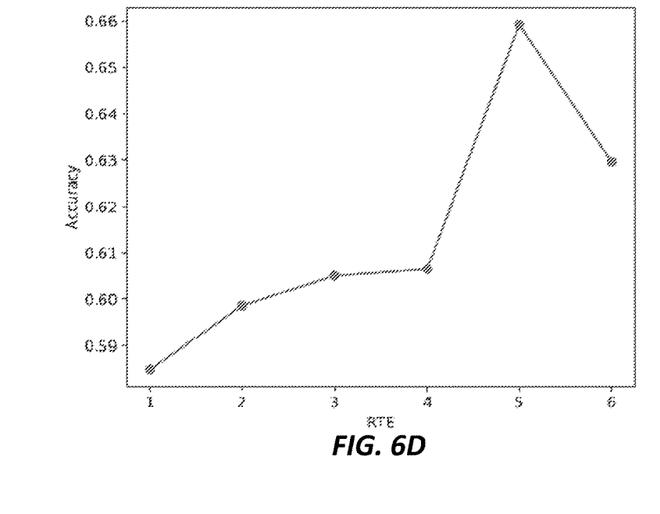

FIG. 5 provides an example table comparing performance of the densely-connected transformer with other baselines, according to one embodiment described herein. Each entry in the table is briefly introduced as below:

ELECTRA$_{SMALL}$ The results are reported from Clark et al.
ELECTRA$_{SMALL}$(ours) reimplementation of ELECTRA.
ELECTRA$_{SMALL}$(ours)+ngram reimplementation of ELECTRA trained with ngram prediction objective.
denseTransformer$_{SMALL}$ The densely connected Transformer trained under the same discrimina-tive task as ELECTRA. The only difference from ELECTRA$_{SMALL}$(ours) is that the transformers have the dense connections.
denseTransformer$_{SMALL}$+ngram dense Transformer$_{SMALL}$ trained with ngram prediction objective. For abbreviation, it is denoted as dense Transformer in the following parts.

FIG. 5 shows ELECTRA pre-trained with ngram prediction objective consistently outperforms the original ELECTRA. It improves more than 0.5 points for SST-2, STS-B, MNLI and QNLI and accounts for 3.1% accuracy increase for RTE. For denseTransformer, a 0.8% improvement on average from ngram prediction objective is observed. In order to corroborate the hypothesis that different tasks are sensitive to varying number of consecutive tokens the dense-Transformer is pre-trained with different ngram prediction objectives. The ngram granularities are selected from 1 to 6 individually. Each ngram pre-trained denseTransformer is fine-tuned on downstream tasks.

FIGS. 6A-6D show different performance metrics of the densely-connected transformer network pre-trained with different ngram granularities, according to embodiments described herein. The x-axis in each figure represents the number of grams used to pre-train the model. For textual similarity task (STS-B), trigram has slightly weaker influence; For paraphrase identification task (QQP), four-gram prediction helps the model to learn better. For sentiment classification (SST), smaller grams less than three tokens have the most positive effect. This task may be more prone to single token like negation word which could completely reverse the meaning of the sentence. While for natural language inference (RTE), longer context prediction clearly contributes the most. It can be partially attributed to length mismatch. The premise sometimes is much longer than the hypothesis and this extra information acts as a distraction for the model. Longer context objective helps the model to attend the sequence globally thus easier to identify distracting information in the hypothesis. In order to cater for different tasks, the full set of ngram length selection ranging from 1-6 are employed as the discriminator prediction objective.

The only difference between the antepenultimate line and the last line in the table of FIG. 5 is adding dense connections between each Transformer layer. denseTransformer achieved better scores across all the datasets. It increase 0.9% accu-racy for MRPC and 2.3% Spearman score for STS-B.

Figure 7:
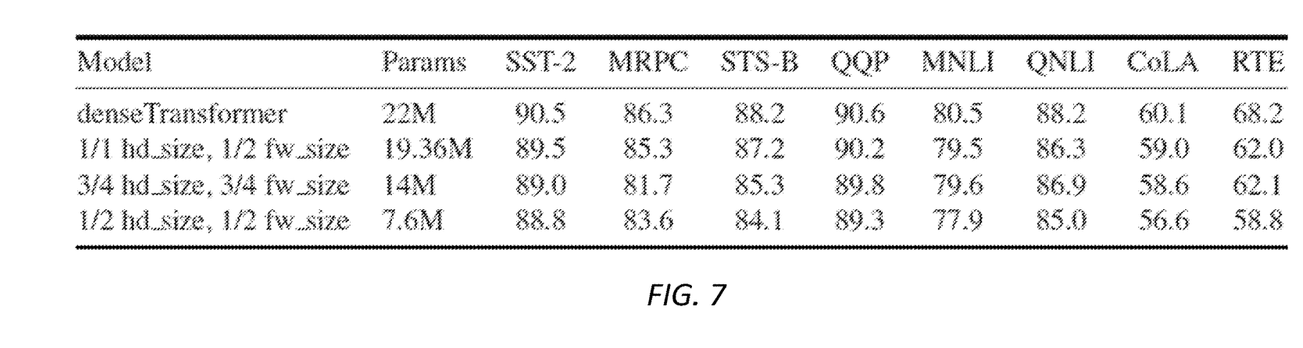
FIG. 7 provides a data table showing the comparison of different size of the densely-connected transformer network on GLUE set, according to embodiments described herein.

In addition, there is a general trend that denseTransformer performs better as the model size grows larger. FIG. 7 provides a data table showing the comparison of different size of the densely-connected transformer network on GLUE set, according to embodiments described herein. In FIG. 7, the size of model in the first line is the reference (H=256, F=1024). In the following lines the HD size and FW size are cut down respectively while keeping other parameters unchanged. For all the datasets, the evaluation metrics are better with the growth of either HD size or FW size. Line 1 and line 2 differs in FW size, while line 2 and line 4 differs in FW size. According to the table, the score discrepancy between line 1 and line 2 is much smaller than that between line 2 and line 4. It indicates that hidden state dimension has more influence on model capacity than FW hidden size.

Figure 8A:
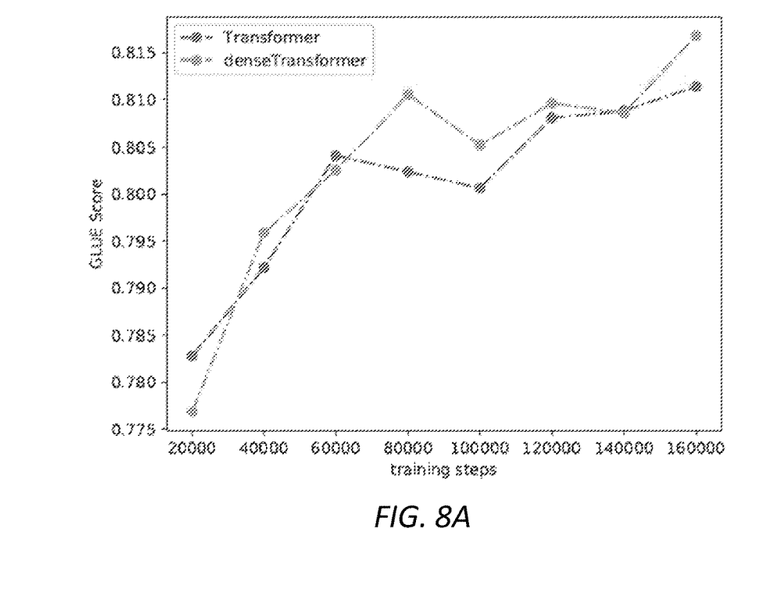
FIGS. 8A-8B provide example data plots showing the performance comparison between the traditional transformer and the densely-connected transformer, according to embodiments described herein.
Figure 8B:
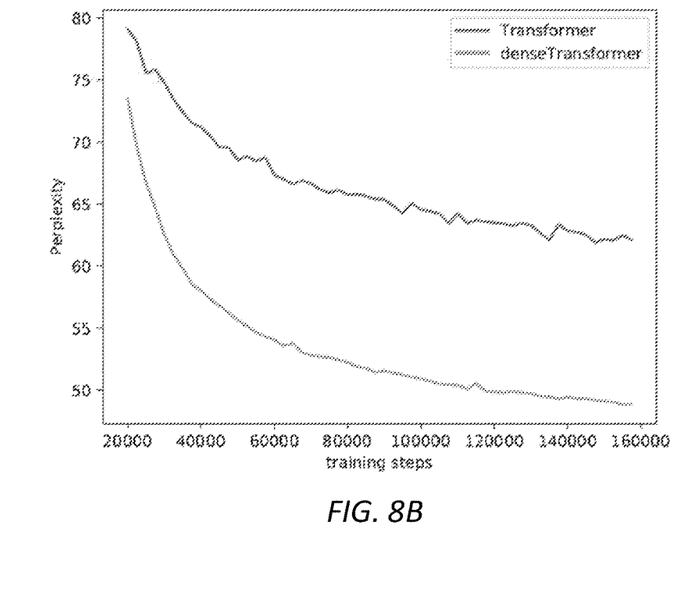

The model checkpoints are saved for every 10000 training steps during training. At each training step, both the Transformer and denseTransformer pass through the same number of training data. FIGS. 8A-8B provide example data plots showing the performance comparison between the traditional transformer and the densely-connected transformer, according to embodiments described herein. In FIG. 8A, the GLUE score is calculated at each checkpoint for the discriminator. It requires less training steps to achieve the same score for denseTransformer compared with Transformer. Pre-trained within the same training steps, denseTransformer could be finetuned to achieve better performance on downstream tasks. In FIG. 8B, the perplexity of the generator is recorded on a held-out validation set. DenseTransformer continues to excel at predicting the masked tokens as the training proceeds. Note that the perplexity score is much higher than other models (e.g. BERT) for the reason that generator is only ¼ size of the discriminator. Given same training budget, denseTransformer could learn more efficiently in both discriminative and generative approaches.

Some examples of computing devices, such as computing device 300 may include non-transitory, tangible, machine readable media that include executable code that when run by one or more processors (e.g., processor 310) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for pre-training a transformer network, the system comprising:
   a first transformer network including a first plurality of transformer layers,
      wherein at least a first transformer layer in the first transformer network receives inputs from all preceding transformer layers of the at least first transformer layer in the first transformer network, and an output of the at least first transformer layer is sent to all subsequent transformer layers of the at least first transformer layer in the first transformer network, and
      wherein the first transformer network receives a masked input sequence of tokens and outputs a first reconstructed sequence with alternative tokens that replace the masked-out tokens; and
   a second transformer network including a second plurality of transformer layers,
      wherein at least a second transformer layer in the second transformer network receives inputs from all preceding transformer layers of the at least second transformer layer in the second transformer network, and an output of the at least second transformer layer is sent to all subsequent transformer layers of the at least second transformer layer in the second transformer network,
      wherein the second transformer network receives the first reconstructed sequence of tokens containing the alternative tokens from the first transformer network and predicts whether a subset of tokens from the first reconstructed sequence contains a replaced token, and
      wherein the second transformer network further selects the subset of tokens having a pre-defined length from the first reconstructed sequence, and generates a probability predicting whether the subset of tokens contains a replaced token.

2. The system of claim 1, wherein the first transformer network and the second transformer network have a similar structure and similar parameters, and the second transformer network has a larger scale than the first transformer network.

3. The system of claim 1, wherein the first transformer network generates a respective probability predicting whether a respective token has been masked out at each masked position in the input sequence, computes a first loss based on generated probabilities at masked positions in the input sequence and updates the first transformer network based on the first loss.

4. The system of claim 3, wherein the first transformer network further generates the first reconstructed sequence based on the generated probabilities and replacing tokens at the masked positions in the first reconstructed sequence with alternative tokens.

5. The system of claim 1, wherein the first reconstructed sequence of tokens includes a first part of original input tokens at unmasked positions and a second part of alternative tokens at masked positions.

6. The system of claim 1, wherein the second transformer network further computes a second loss based on generated probabilities of all selected subsets of tokens and labels from the first reconstructed sequence.

7. The system of claim 1, wherein the second transformer network is updated by a weighted sum of a first loss computed based on first output probabilities of the first transformer network, and a second loss computed based on second output probabilities of the second transformer network.

8. The system of claim 1, wherein during an inference stage, the first transformer network is detached from the second transformer network after the second transformer network is updated during a training stage.

9. The system of claim 8, wherein during the inference stage, the second transformer network is separately updated for downstream tasks without the first transformer network.

10. A method for multi-scale discriminative pre-training with densely connected transformer network, the method comprising:
   receiving, at a first transformer network, a masked input sequence of tokens;
   generating, by the first transformer network, alternative tokens that replace the masked-out tokens;
   sending, from the first transformer network to a second transformer network, a reconstructed sequence of tokens with masked-out tokens replaced by the generated alternative tokens;
   generating a first probability predicting whether a subset of tokens from the reconstructed sequence contains a replaced token;
   computing a discriminator loss based at least in part on the generated probability;
   updating the second transformer network based at least on the computed discriminator loss; and during a training stage, updating the second transformer network by a weighted sum of a first loss computed based on first output probabilities of the first transformer network, and a second loss computed based on second output probabilities of the second transformer network.

11. The method of claim 10, wherein the first transformer network and the second transformer network have a similar structure and similar parameters, and the second transformer network has a larger scale than the first transformer network.

12. The method of claim 10, wherein the first transformer network includes at least a first transformer layer that receives inputs from all preceding transformer layers of the at least first transformer layer in the first transformer network, and an output of the at least first transformer layer is sent to all subsequent transformer layers of the at least first transformer layer in the first transformer network.

13. The method of claim 10, further comprising:
generating, by the first transformer network, a respective probability predicting whether a respective token has been masked out at each masked position in the masked input sequence;
computing a first loss based on generated probabilities at masked positions in the masked input sequence; and
updating the first transformer network based on the first loss.

14. The method of claim 13, further comprising:
generating, by the first transformer network, the reconstructed sequence based on the generated probabilities; and
replacing tokens at the masked positions in the reconstructed sequence with alternative tokens.

15. The method of claim 10, further comprising:
continuously selecting subsets of tokens, starting from a first token in the reconstructed sequence, and
generating a respective probability predicting whether each subset of tokens contains a replaced token.

16. The method of claim 15, wherein the discriminator loss is computed based on generated probabilities of all selected subsets of tokens and labels from the reconstructed sequence.

17. The method of claim 10, further comprising:
during an inference stage, disconnecting the first transformer network from the second transformer network; and
training the second transformer network separately for downstream tasks without the first transformer network.

18. A non-transitory processor-readable medium storing processor-executable instructions for multi-scale discriminative pre-training with densely connected transformer network, the instructions being executed by one or more processors to perform operations comprising:
receiving, at a first transformer network, a masked input sequence of tokens;
generating, by the first transformer network, alternative tokens that replace the masked-out tokens;
sending, from the first transformer network to a second transformer network, a reconstructed sequence of tokens with masked-out tokens replaced by the generated alternative tokens;
predicting, by the second transformer network, whether a subset of tokens from the reconstructed sequence contains a replaced token;
generating, by the second transformer network, a first probability predicting whether the subset of tokens having a pre-defined length from the reconstructed sequence contains a replaced token;
computing a discriminator loss based at least in part on the generated probability; and
updating the second transformer network based at least on the computed discriminator loss.

* * * * *